(12) United States Patent
Hay et al.

(10) Patent No.: US 9,930,024 B2
(45) Date of Patent: Mar. 27, 2018

(54) DETECTING SOCIAL LOGIN SECURITY FLAWS USING DATABASE QUERY FEATURES

(71) Applicant: International Business Machines Corporation, Armonk, NY (US)

(72) Inventors: Roee Hay, Haifa (IL); Or Peles, Reut (IL)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/929,820

(22) Filed: Nov. 2, 2015

(65) Prior Publication Data

US 2017/0126650 A1 May 4, 2017

(51) Int. Cl.
*H04L 29/06* (2006.01)
*G06F 17/30* (2006.01)

(52) U.S. Cl.
CPC ........ *H04L 63/08* (2013.01); *G06F 17/30598* (2013.01); *G06F 17/30867* (2013.01); *H04L 63/12* (2013.01); *H04L 63/1425* (2013.01)

(58) Field of Classification Search
CPC ..... H04L 63/08; H04L 63/12; H04L 63/1425; G06F 17/30598; G06F 17/30867
USPC ........................................................ 726/25
See application file for complete search history.

(56) References Cited

U.S. PATENT DOCUMENTS

| 7,975,296 B2 * | 7/2011 | Apfelbaum ........... G06F 21/577 726/22 |
| 8,392,963 B2 | 3/2013 | Shulman et al. |
| 8,695,098 B2 | 4/2014 | Pistoia et al. |
| 8,763,152 B2 | 6/2014 | Vernal et al. |
| 2013/0091541 A1* | 4/2013 | Beskrovny .......... G06F 11/3688 726/1 |

FOREIGN PATENT DOCUMENTS

CN 103685741 A 3/2014

OTHER PUBLICATIONS

Wang, Rui et al., "Signing Me onto Your Accounts through Facebook and Google: a Traffic-Guided Security Study of Commercially Deployed Single-Sign-On Web Services", 2012 IEEE Symposium on Security and Privacy (SP), published May 20, 2012, 16 pages.*

(Continued)

*Primary Examiner* — Yogesh Paliwal
(74) *Attorney, Agent, or Firm* — Francis Lammes; Stephen J. Walder, Jr.; Jeffrey S. LaBaw

(57) ABSTRACT

Techniques for detecting security flaws are described herein. An example system includes a processor to perform a login attempt into a website to be tested using a first social login account and a first verification to determine whether the first social login account is logged in. The processor can monitor a database associated with the website for queries. The processor can perform a second login attempt into the website using a second social login account and a second verification to determine whether the second social login account is logged in. The processor can perform a third login attempt using a third social login account. The processor can detect a second set of features based on the queries during the third login attempt. The processor can detect a social login security flaw based on the first and second verification, and the first and second set of detected features.

20 Claims, 7 Drawing Sheets

(56) References Cited

OTHER PUBLICATIONS

Florencio, Dinei et al., "A Large-Scale Study of Web Password Habits", WWW 2007, http://research.microsoft.com/pubs/74164/www2007.pdf, Banff, Alberta, Canada, May 8-12, 2007, 9 pages.
Wang, Rui et al., "Signing Me onto Your Accounts through Facebook and Google: A Traffic-Guided Security Study of Commercially Deployed Single-Sign-On Web Services", 2012 IEEE Symposium on Security and Privacy (SP), http://www.informatics.indiana.edu/xw7/papers/websso.pdf, published May 20, 2012, 16 pages.

\* cited by examiner

DETECTING SOCIAL LOGIN SECURITY FLAWS USING DATABASE QUERY FEATURES

BACKGROUND

The present techniques relate to detecting social login security flaws. More specifically, the techniques relate to detecting security flaws based on features detected based on queries during login attempts.

SUMMARY

According to an embodiment described herein, a system can include a processor to perform a login attempt into a service to be tested using a first social login account and a first verification to determine whether the first social login account is logged in. The processor can also further monitor a database associated with the website for queries. The processor can also perform a second login attempt into the website using a second social login account and a second verification to determine whether the second social login account is logged in, the processor to detect a first set of features based on the queries during the second login attempt. The processor can also further perform a third login attempt using a third social login account. The third social login account can use an identity provider used by the second social login account and can include account information different from account information of the second login account. The processor can further detect a second set of features based on the queries during the third login attempt. The processor can also detect a social login security flaw based on the first verification, the second verification, the first set of detected features, and the second set of detected features.

According to another embodiment described herein, a method can include performing, via a processor, a login attempt into a service to be tested using a first social login account. The method can further include performing, via the processor, a first verification to determine whether the first social login account is logged in. The method can also further include monitoring, via the processor, a database associated with the service for queries. The method can also include performing, via the processor, a second login attempt into the service using a second social login account. The method can include detecting, via the processor, a first set of features based on the queries during the second login attempt. The method can also include performing, via the processor, a second verification to determine whether the second social login account is logged in. The method can further include performing, via the processor, a third login attempt using a third social login account. The third social login account can use the same identity provider as the second social login account and can include account information different from account information of the second login account. The method can also further include detecting, via the processor, a second set of features based on the queries during the second login attempt and detecting that the third social login account is logged in. The method can also include detecting, via the processor, a security flaw based on the first verification, the second verification, the first set of detected features, and the second set of detected features. The method can further include modifying, via the processor, the service based on the detected security flaw.

According to another embodiment described herein, a computer program product for detection of social login security flaws can include a computer-readable storage medium having program code embodied therewith. The computer readable storage medium is not a transitory signal per se. The program code executable by a processor to cause the processor to perform a login attempt into a website to be tested using a first social login account. The program code can also cause the processor to perform a first verification to determine whether the first social login account is logged in. The program code can also cause the processor to monitor a database associated with the website for queries. The program code can also cause the processor to perform a second login attempt into the website using a second social login account. The program code can also cause the processor to detect a first set of features during the second login attempt based on the queries. The program code can also cause the processor to also further perform a second verification to determine whether the second social login account is logged in. The program code can also cause the processor to perform a third login attempt using a third social login account, wherein the third social login account uses the same identity provider as the second social login account and comprises account information different from account information of the second login account. The program code can also further cause the processor to detect a second set of features during the second login attempt based on the queries and detect whether the third social login account is logged in. The program code can also cause the processor to detect a security flaw based on the first verification, the second verification, the first set of detected features, and the second set of detected features.

DETAILED DESCRIPTION

Figure 1:
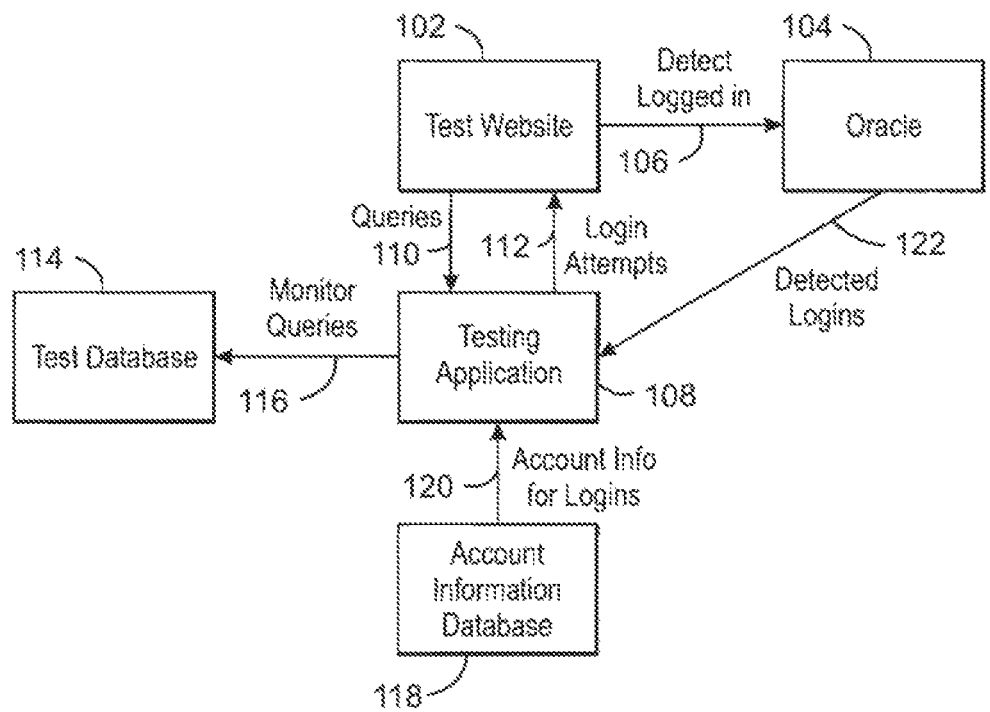
FIG. 1 is a block diagram of an example system for detecting social login security flaws.

Many services and websites may contain private user information. For example, websites may maintain local user accounts and demand authentication by username and password. Because users may have many passwords for accessing different services and websites, studies show that the average user tends to reuse the same password across many websites. The practice of password reuse comes with security implications. For example, if a username and password list of a single website is transmitted to unauthorized users, the unauthorized users can use the username and password combinations to gain access to various different accounts for each username and password combination. Additionally, causing a user to remember many different usernames and passwords may lead to a bad user experience.

To prevent the reuse of passwords and proliferation of different passwords, a technique called social login has emerged and gained much popularity. Social login, as used herein, refers to an authentication technique that allows a user to use a single account in order to access many different cooperating websites and services. In some embodiments, the cooperating websites and services may include social media websites, email accounts, retail accounts, and any other suitable social or non-social service or website. The single account functions as the digital identity of a user for any number of services or websites. Accordingly, the issuer of a social login account is referred to herein as an identity provider. Typically, the identity provider can be a social network provider. However, an identify provider can be any suitable provider of identity verification services. For example, when signing into a website that supports a social login, a user can choose to login using a social login account by clicking a "Sign In with Social Login Account" button instead of using local site credentials.

In a typical social login flow, the user's details are supplied by the identity provider to the target website that the user wants to access. As described above, a user can visit a website and click on a "Sign In using X Provider" button. The user is redirected from the target website to the identity provider. The user authenticates with the identity provider. After authenticating the user, the identity provider redirects the user back to the target website. In some examples, the identity provider may redirect the user with a signed parameter that includes information about the identity of a user. For example, the information can include a unique id, or an email address, among other information about the identity of the user. In some examples, the identity provider may redirect the user with a parameter that can be used by the website to fetch information from the website of the identity provider.

Upon receiving the information of the social login identity, the target website may respond in various ways. First, the target website may log the user into an existing local account that was already associated with the current social login identity. For example, the target website may log a user into either an account that was created using this social login identity or an account that was explicitly linked with this social login identity in the past. Second, the website may automatically create a new local account based on the information received from the social login website, while logging the user into the new local account. Third, the website may log the user into an existing local account that was not previously associated with the current social login identity. Fourth, the website may reject the credentials and leave the user out of the website.

According to techniques of the present disclosure, a testing service can detect social login security flaws based on features detected during database queries of a database associated with a website to be tested. Thus, techniques of the present disclosure provide techniques for testing a scenario wherein a website may log a user into an existing local account not previously associated with the current social login identity of the user. Thus, the techniques enable a testing application or service to test a website for social account login vulnerabilities without tester input or relying on user identifications in web pages.

In some scenarios, the techniques described herein may be implemented in a cloud computing environment. As discussed in more detail below in reference to at least FIGS. 3-6, a computing device configured to detect social login vulnerabilities may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for detecting social login security flaws. The example system is generally referred to by the reference number 100. FIG. 1 includes a test website 102 communicatively coupled to an oracle 104 as indicated by an arrow 106. For example, the oracle can be a blackbox tester that can detect a login state by reading the response's output. The test website 102 is also communicatively coupled to a testing application 108 as indicated by arrows 110, 112. The testing application 108 is communicatively coupled to a test database 114 as indicated by an arrow 116. The testing application 108 is further communicatively coupled to an account information database 118 as indicated by an arrow 120. The testing application 108 can also be communicatively coupled to the oracle 104 as indicated by an arrow 122.

In the example of FIG. 1, the testing application 108 can test the test website 102 for social login vulnerabilities. For example, the test website 102 may log a user into an existing local account of the website that was not previously associated with the current social login identity provided by the user, as discussed above. In some examples, the testing application 108 can test the test website 102 for authentication security vulnerabilities related to the social login authentication mechanism. For example, the testing application 108 can detect specific actions of the test website 102 based on queries sent by the test website 102 to a test database 114.

Still referring to FIG. 1, the testing application 108 can provide a functionally empty test database 114 for the test website 102 to use. The test database 114 can include accounts with no relation to accounts to be tested in an account information database 118. For example, the accounts in the test database 114 may have different user names, emails, phone numbers, etc. The account database 118 can be a database associated with a social login provider.

In some examples, the pre-registered identity accounts in the account information database 118 can also have different details. For example, the account information database can include three or more pre-registered identity accounts with different user names, emails, phone numbers, etc. In some examples, the pre-registered identity accounts may have been registered with one or more external identity providers and preconfigured based on the test to be performed.

Still referring to FIG. 1, the testing application 108 can perform a plurality of login attempts as indicated by arrow 112 and described in detail with respect to FIGS. 2A and 2B below. The oracle 104 can detect whether an account is logged in at the test website 102 as indicated by arrow 106. In some examples, the oracle 104 can receive uniform resource locators (URLs) and other session related data such as cookies, from the testing application 108 specifying specific web pages that may contain different text depending on the login state and the text that can be searched for identifying each login state. For example, the appearance of the word "logout" on a main page of a website may indicate that the account being tested is logged in. In some examples, the oracle 104 can send the detected logins to the testing application 108 as indicated by arrow 122. In addition, the testing application 108 can monitor queries received from the test website 102 for the test database 114. For example, the queries can include one or more features that can be recorded by the testing application 108 during login attempts. In some examples, the testing application 108 can use metadata obtained during the monitoring of database queries made by the tested website during login attempts to distinguish between login types. For example, a feature vector C can be generated for each login attempt. In some examples, each entry of the vector C can be a counter of some query type. For example, the vector can be expressed in the form: $C=(C_1, C_2, \ldots, C_N)$. In some examples, the testing application 108 can maintain a counter's vector $C_{test}$ for each login attempt that may result in either a new account creation or logging into an existing account. For example, for a certain account creation attempt, the testing application 108 can generate and maintain a counter's vector $C_{creation}$. In some examples, the testing application 108 can take multiple samples of $C_{test}$ and $C_{creation}$. For example, the testing application 108 can take multiple samples for each vector in order to increase confidence in the results. In some examples, the testing application 108 can then compare the two vectors $C_{test}$ and $C_{creation}$ using suitable classification techniques for identifying vector clusters and/or anomalies. A cluster, as used herein, refers to a plurality of vectors that are similar. An anomaly, as used herein, refers to a vector that is an outlier with respect to other vectors. An outlier, as used herein, refers to a feature vector that is unlikely. For example, if the $C_{test}$ and $C_{creation}$ samples are classified as the same cluster, the testing application 108 can detect that the login attempt associated with the $C_{test}$ vector resulted in an account creation. In some examples, if the classification techniques classify $C_{test}$ as a non-anomaly with respect to the $C_{creation}$ cluster, then the testing application 108 can detect that the login attempt associated with the $C_{test}$ vector resulted in account creation.

In some embodiments, techniques described herein enable distinguishing between accounts merging from account creation regardless of the specific creation scenario. Thus, given $C_{creation}$, a known creation scenario, it is possible to determine whether $C_{test}$, a sampled login attempt, is of an account-merging scenario.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2A:
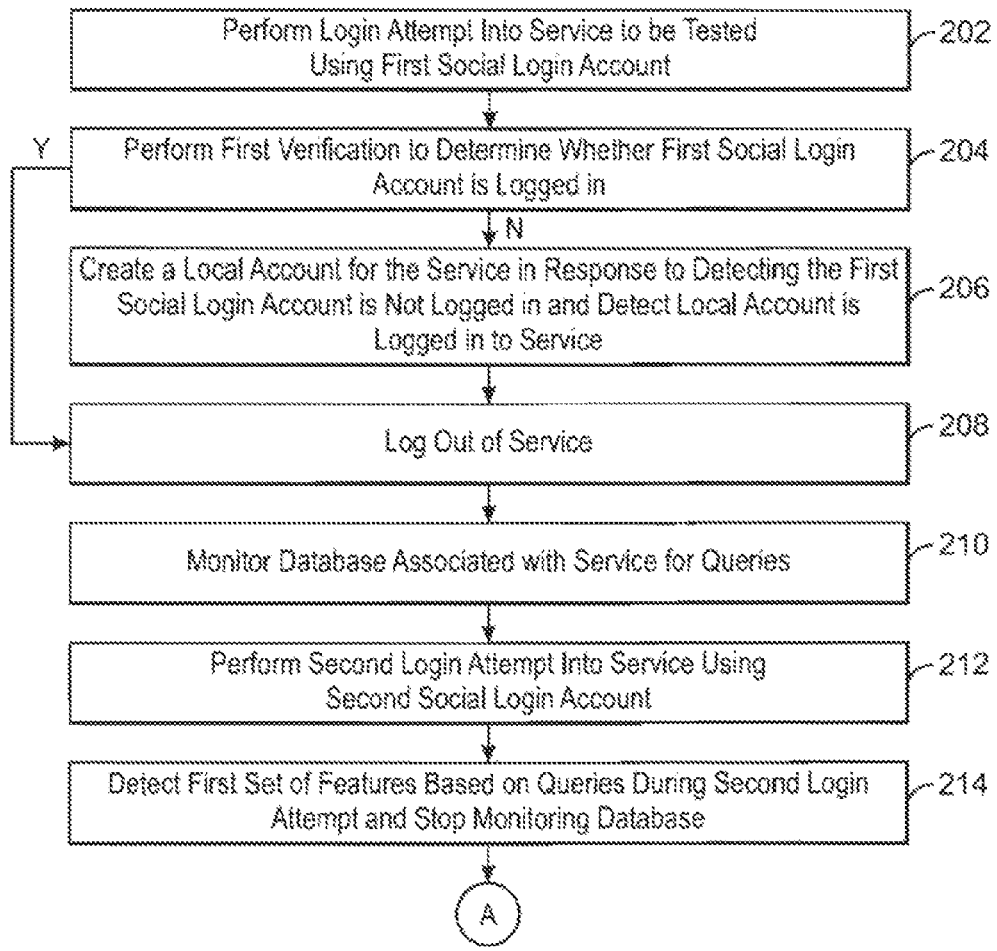
FIG. 2A is a process flow diagram of an example method that can detect social login security flaws.

FIG. 2A is a process flow diagram of an example method that can detect social login security flaws. The method 200 can be implemented with any suitable computing device, such as the computing device 300 of FIG. 3 or the system 100 of FIG. 1. For example, the methods described below can be implemented by the testing application of FIG. 1 above.

At block 202, the testing application performs a login attempt into a service to be tested using a first social login account. For example, the service can be a website offering content. In some examples, the first social login account can be retrieved by the testing application from an account information database with preconfigured account information for the test.

At block 204, the testing application performs a first verification to determine whether the first social login account is logged in. For example, the testing application can verify information received from an oracle to determine whether a detected login has been received. If the first social login account is logged in, then the method may continue at block 208. If the first social login account is not logged in, then the method may continue at block 206.

At block 206, the testing application creates a local account for the service in response to detecting that the first social login account is not logged in and detect that the local account is logged in to the service. For example, in response to not detecting any received detected login from the oracle, the testing application can automatically create a local account using the account information. The testing application can then transmit a verification request to the oracle, which can result in the oracle determining if a local account is logged in. For example, the testing application may receive a detected login from the oracle after creating the local account and logging in.

At block 208, the testing application logs out of the service. For example, the testing application can send a logout instruction to the test service.

At block 210, the testing application monitors a database associated with the service for queries. For example, the testing application may receive queries directly from the tested service and forward the queries to the test database. In some examples, the testing application may receive recorded queries from an agent installed at the tested service. For example, the testing application can monitor for queries recorded by the agent.

At block 212, the testing application performs a second login attempt into the service using a second social login account. For example, the testing application can retrieve a second social login account from an account information database and attempt a login using the account information.

At block 214, the testing application detects a first set of features based on the queries during a second login attempt. For example, the testing application can maintain a first feature vector for the first set of features and a second feature vector for the second set of features. For example, the first set of features may correspond to the $C_{test}$ vector discussed at greater length in FIG. 1 above. The testing application can save the detected first set of features in the $C_{test}$ vector for use in detection at block 228 below. In some examples, the testing application can also stop monitoring the database.

The process flow diagram of FIG. 2A is not intended to indicate that the operations of the method 200 are to be executed in any particular order, or that all of the operations of the method 200 are to be included in every case. Additionally, the method 200 can include any suitable number of additional operations.

Figure 2B:
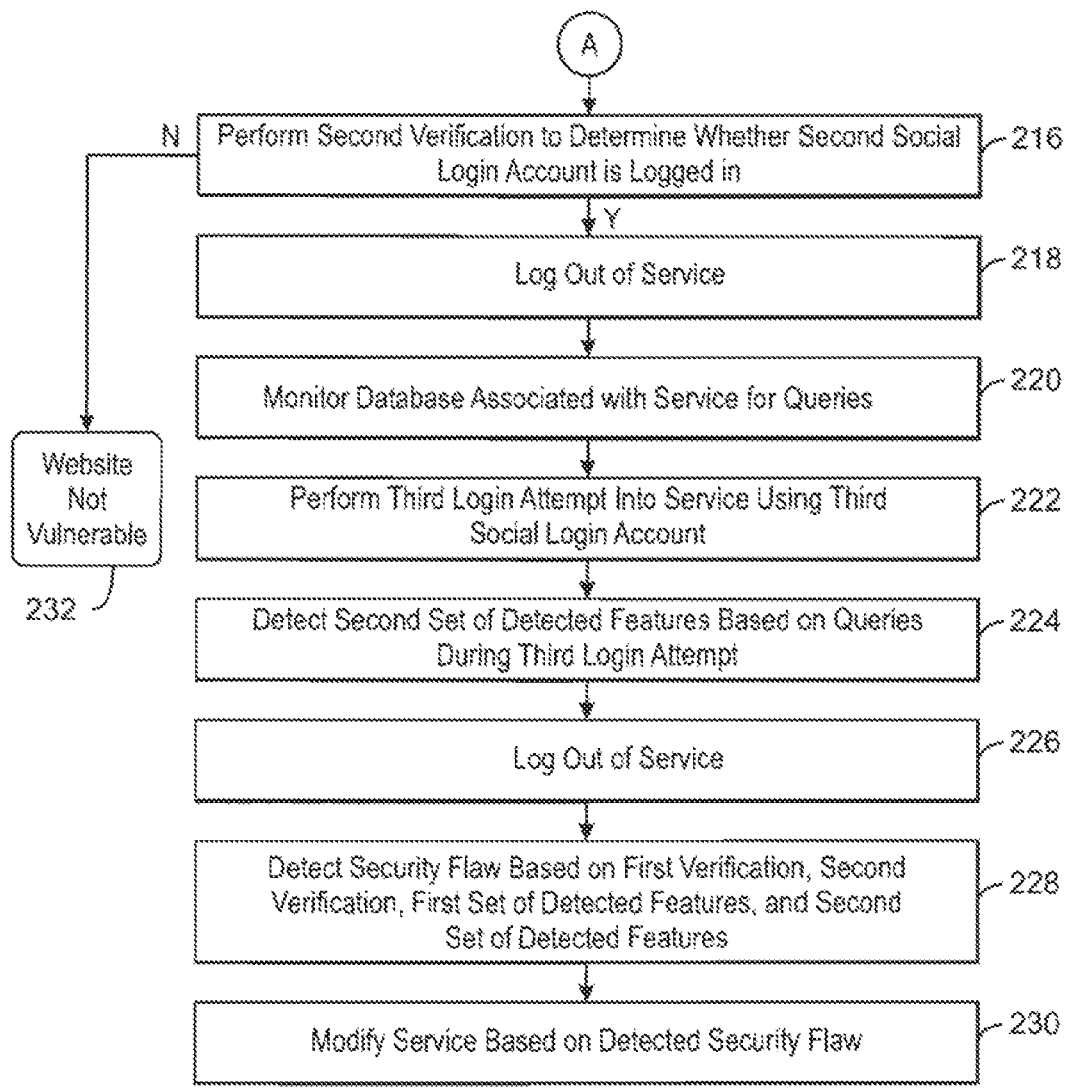
FIG. 2B is a continuation of the process flow diagram of the example method that can detect social login security flaws.

FIG. 2B a continued process flow diagram of the example method that can detect social login security flaws. The method 200 can be implemented with any suitable computing device, such as the computing device 300 of FIG. 3 and is described with reference to the system 100 of FIG. 1. For example, the methods described below can be implemented by the testing application of FIG. 1 above.

At block 216, the testing application performs a second verification to determine whether the second social login account is logged in. For example, the testing application can verify whether a detected login has been received from an oracle.

At block 218, the testing application logs out of the service. For example, the testing application can send a logout instruction to the test service.

At block 220, the testing application monitors the database associated with the service for queries. For example, the testing application may receive queries directly from the test service and forward the queries to the test database. In some examples, the testing application may receive recorded queries from an agent installed at the test service. For example, the testing application can monitor for queries recorded by the agent.

At block 222, the testing application performs a third login attempt using a third social login account. For example, the third social login account can be retrieved by the testing application from an account information database with preconfigured account information for the test. In some examples, the third social login account uses the same identity provider as the second social login account and comprises account information different from account information of the second login account. For example, a user name and/or an email address of the third social account may differ from the second social account.

At block 224, the testing application detects a second set of features based on the queries during the third login attempt. For example, the second set of features may correspond to the $C_{creation}$ vector discussed at greater length in FIG. 1 above. The testing application can save the detected second set of features in the $C_{creation}$ vector for use in detection at block 228 below. For example, the testing application can compare the first feature vector $C_{test}$ with a second feature vector $C_{creation}$ to detect a cluster, and detect that the login attempt associated with the first feature vector resulted in an account creation in response to detecting the cluster. In some examples, the testing application can then stop monitoring and detect that the third social login account is logged in. For example, the testing application can detect that a detected login has been received from the oracle.

At block 226, the testing application logs out of the service. For example, the testing application can send a logout instruction to the test service.

At block 228, the testing application detects a security flaw based on the first verification, the second verification, the first set of detected features, and the second set of detected features. For example, detecting the security flaw can be based on detecting that the first social login account was not logged in at the first verification and detecting that the second social login account was logged in at the second verification. In some examples, detecting the security flaw can be based on detecting the first social login account was logged in at the first verification, detecting the second social login account was logged in at the second verification, and detecting the first set of features are an outlier to the second set of features. For example, detecting the first set of features are an outlier to the second set of features further comprises using anomaly detection. For example, anomaly detection can include unsupervised anomaly detection with the $C_{creation}$ vectors considered normal. In some examples, the testing application can detect a vulnerability based on a lack of detected login at block 204 and a detected login at block 216. For example, the service may not support automatic account creation as detected from the lack of detected login at block 204. Therefore, the vulnerability can be detected from the detection of a detected login at block 216, indicating a login to an account that was not linked before.

At block 230, the service can be modified based on the detected security flaw. For example, the service can be modified to prevent access using the second social login. In some examples, the service can be modified to prevent a second social login account from logging the user into an existing local account that was not previously associated with the second social login identity.

If the second social login account is not logged in at block 216, the testing application can at block 232 detect that the service is not vulnerable. The test service may not be vulnerable to the social login vulnerability being tested. For example, the login attempt may have been blocked due to the existence of an account with similar details, such as a user name and/or email.

The process flow diagram of FIG. 2B is not intended to indicate that the operations of the method 200 are to be executed in any particular order, or that all of the operations of the method 200 are to be included in every case. Additionally, the method 200 can include any suitable number of additional operations.

Figure 3:
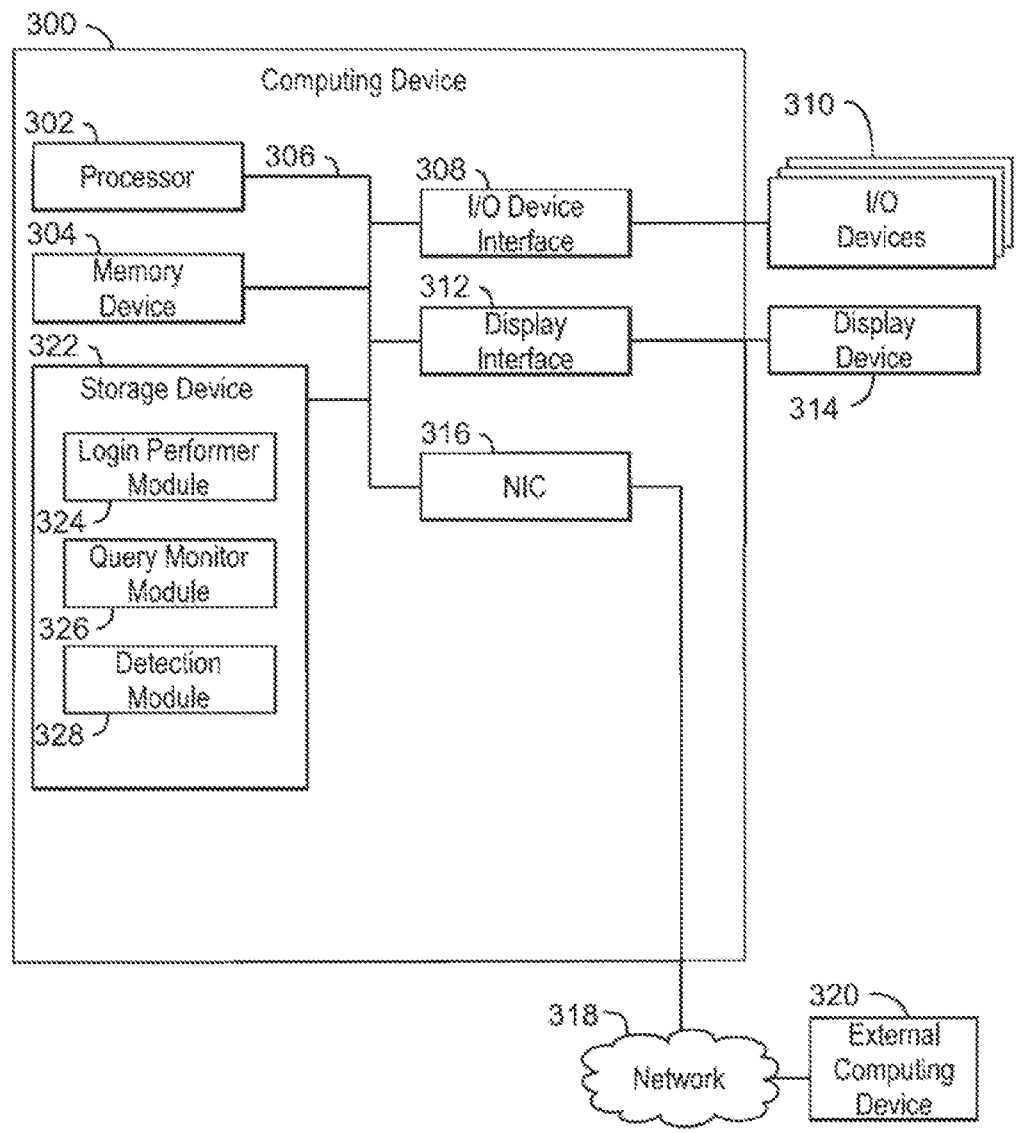
FIG. 3 is a block diagram of an example computing device that can detect social login security flaws.

With reference now to FIG. 3, an example computing device can detect social login security flaws. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. External computing devices 320 may connect to the computing device 300 through the network 318. In some examples, external computing devices 320 may include an external webserver 320. For example, the external webserver 320 may host a service to be accessed by a mobile application on a client device. In some examples, external computing devices 320 may include one or more cloud computing nodes.

The processor 302 may also be linked through the system interconnect 306 to a storage device 322 that can include a hard drive, an optical drive, a USB flash drive, an array of drives, or any combinations thereof. In some examples, the storage device may include a login performer module 324, a query monitor module 326, and a detection module 328. The login performer module 324 can perform a login attempt into a website to be tested using a first social login account and a first verification to determine whether the first social login account is logged in. In some examples, the login performer module 324 can create a local account for the website in response to detecting that the first social login account is not logged in and detect that the local account is logged in to the website. The query monitor module 326 can monitor a database associated with the website for queries. The login performer module 324 can also perform a second login attempt into the website using a second social login account and a second verification to determine whether the second social login account is logged in, the processor to record a first set of features during second login attempt. The login performer module 324 can further perform a third login attempt using a third social login account, wherein the third social login account uses the same identity provider as the second social login account and comprises account information different from account information of the second login account. For example, the account information can include a user name and an email address. The query monitor module 326 can record a second set of features during the third login attempt. The detection module 328 can detect a social login security flaw based on the first verification, the second verification, the first set of detected features, and the second set of detected features. For example, the social login security flaw can include the second login attempt using the second social login account logging into an existing account of the first social login account. In some examples, the detection module 328 can detect the security flaw in response to detecting that the first social login account was not logged in at the first verification and detecting that the second social login account was logged in at the second verification. In some examples, the detection module 328 can detect the security flaw in response to detecting the first social login account was logged in at the first verification, detecting the second social login account was logged in at the second verification, and detecting the first set of features are an outlier to the second set of features. For example, the detection module 328 can detect the first set of features are an outlier to the second set of features based on anomaly detection.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the login performer module 324, the query monitor module 326, and the detection module 328 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the login performer module 324, query monitor module 326, and detection module 328 can be implemented with logic, wherein the logic, as referred to herein, can include any suitable hardware (e.g., a processor, among others), software (e.g., an application, among others), firmware, or any suitable combination of hardware, software, and firmware.

Figure 4:
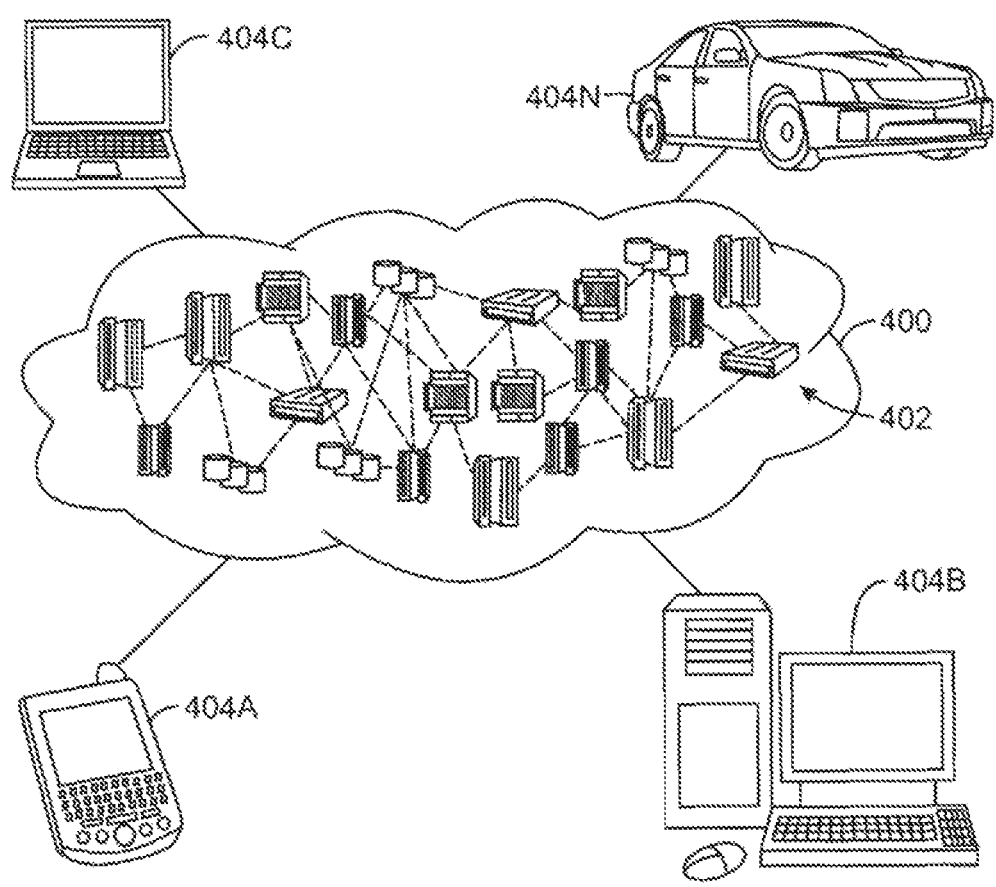
FIG. 4 is an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
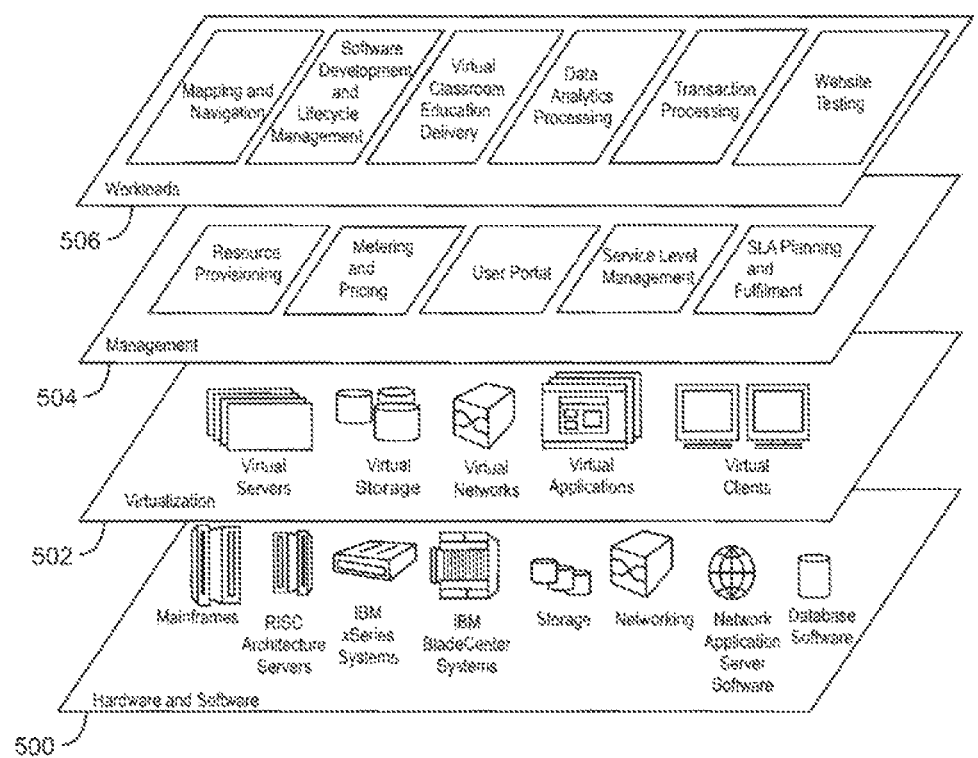
FIG. 5 is an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and website testing.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
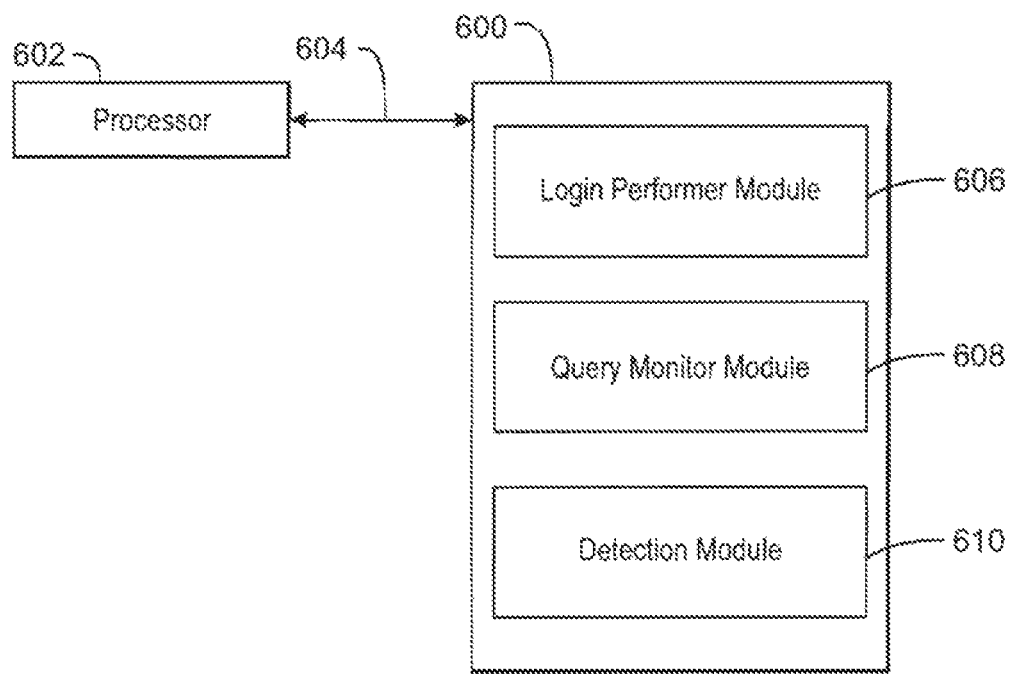
FIG. 6 is an example of tangible, non-transitory computer-readable medium that can detect social login security flaws.

Referring now to FIG. 6, a block diagram is depicted of an example tangible, non-transitory computer-readable medium 600 that can detect social login security flaws. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 500 of FIG. 5 above.

The various software components discussed herein may be stored on the tangible, non-transitory, computer-readable medium 600, as indicated in FIG. 6. For example, a login performer module 606 includes code to perform a login attempt into a website to be tested using a first social login account. The login performer module 606 also includes code to perform a first verification to determine whether the first social login account is logged in. In some examples, the login performer module 606 includes code to create a local account for the website in response to detecting that the first social login account is not logged in and detect that the local account is logged in to the website. A query monitor module 608 includes code to monitor a database associated with the website for queries. The login performer module 606 further includes code to perform a second login attempt into the website using a second social login account. The query monitor module 608 also includes code to record a first set of features based on the queries during the second login attempt. The login performer module 606 includes code to perform a second verification to determine whether the second social login account is logged in. The login performer module 606 also includes code to perform a third login attempt using a third social login account. In some examples, the third social login account can use the same identity provider as the second social login account. The third social login account can also include account information different from the account information of the second login account. In some examples, the login performer module 606 includes code to log out of the website after the first verification, the second verification, and the detection of the third social login account login. The query monitor module 608 also includes code to record a second set of features based on the queries during the second login attempt and detect the third social login account is logged in. The detection module 610 includes code to detect a security flaw based on the first verification, the second verification, the first set of detected features, and the second set of detected features. For example, the detection module 610 can detect the security flaw in response to detecting that the first social login account was not logged in at the first verification and detecting that the second social login account was logged in at the second verification. In some examples, the detection module 610 can detect the security flaw in response to detecting the first social login account was logged in at the first verification, detecting the second social login account was logged in at the second verification, and detecting the first set of features are an outlier to the second set of features. In some examples, the detection module 610 can repeat the first, second, and third login attempts and record the resulting features to improve accuracy of the detection.

It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a memory coupled to the processor, wherein the memory comprises instructions which, when executed by the processor, cause the processor to:
perform a login attempt into a service to be tested using a first social login account and a first verification to determine whether the first social login account is logged in;
monitor a database associated with the website for queries;
perform a second login attempt into the website using a second social login account and a second verification to determine whether the second social login account is logged in, the processor to detect a first set of features based on the queries during the second login attempt;
perform a third login attempt using a third social login account, wherein the third social login account uses an identity provider used by the second social login account and comprises account information different from account information of the second login account;
detect a second set of features based on the queries during the third login attempt; and
detect a social login security flaw based on the first verification, the second verification, the first set of detected features, and the second set of detected features.

2. The system of claim 1, wherein the account information comprises a user name and an email address.

3. The system of claim 1, wherein the social login security flaw comprises the second login attempt using the second social login account logging into an existing account of the first social login account.

4. The system of claim 1, wherein the instructions further cause the processor to:
create a local account for the website in response to detecting that the first social login account is not logged in and in response to detecting that the local account is logged in to the website.

5. The system of claim 1, wherein the instructions further cause the processor to:
detect the security flaw in response to detecting that the first social login account is not logged in at a time of the first verification and detecting that the second social login account is logged in at a time of the second verification.

6. The system of claim 1, wherein the instructions further cause the processor to:
detect the security flaw in response to detecting the first social login account was logged in at the first verification, detecting the second social login account was logged in at the second verification, and detecting the first set of features are an outlier to the second set of features.

7. The system of claim 6, wherein the instructions further cause the processor to;
detect the first set of features are an outlier to the second set of features based on anomaly detection.

8. A computer-implemented method, comprising:
performing, via a processor, a login attempt into a service to be tested using a first social login account;
performing, via the processor, a first verification to determine whether the first social login account is logged in;
monitoring, via the processor, a database associated with the service for queries;
performing, via the processor, a second login attempt into the service using a second social login account;
detecting, via the processor, a first set of features based on the queries during the second login attempt;
performing, via the processor, a second verification to determine whether the second social login account is logged in;
performing, via the processor, a third login attempt using a third social login account, wherein the third social login account uses the same identity provider as the second social login account and comprises account information different from account information of the second login account;
detecting, via the processor, a second set of features based on the queries during the second login attempt and detecting that the third social login account is logged in;
detecting, via the processor, a security flaw based on the first verification, the second verification, the first set of detected features, and the second set of detected features; and
modifying, via the processor, the service based on the detected security flaw.

9. The computer-implemented method of claim 8, further comprising creating, via the processor, a local account for the service in response to detecting that the first social login account is not logged in and in response to detecting that the local account is logged in to the service.

10. The computer-implemented method of claim 8, wherein detecting the first set of features and the second set of features further comprises maintaining a first feature vector for the first set of features and a second feature vector for the second set of features.

11. The computer-implemented method of claim 10, further comprising comparing the first feature vector with the second feature vector to detect a cluster, and detecting that the login attempt associated with the first feature vector resulted in an account creation in response to detecting the cluster.

12. The computer-implemented method of claim 8, wherein detecting the security flaw is based on detecting that the first social login account was not logged in at the first verification and detecting that the second social login account was logged in at the second verification.

13. The computer-implemented method of claim 8, wherein detecting the security flaw is based on detecting the first social login account was logged in at the first verification, detecting the second social login account was logged in at the second verification, and detecting the first set of features are an outlier to the second set of features.

14. The computer-implemented method of claim 13, wherein detecting the first set of features are an outlier to the second set of features further comprises using anomaly detection.

15. A computer program product for detection of social login security flaws, the computer program product comprising a computer-readable storage medium having program code embodied therewith, wherein the computer readable storage medium is not a transitory signal per se, the program code executable by a processor to cause the processor to:
perform a login attempt into a website to be tested using a first social login account;
perform a first verification to determine whether the first social login account is logged in;
monitor a database associated with the website for queries;
perform a second login attempt into the website using a second social login account;
detect a first set of features during the second login attempt based on the queries;
perform a second verification to determine whether the second social login account is logged in;
perform a third login attempt using a third social login account, wherein the third social login account uses the same identity provider as the second social login account and comprises account information different from account information of the second login account;
detect a second set of features during the second login attempt based on the queries and detect the third social login account is logged in; and
detect a security flaw based on the first verification, the second verification, the first set of detected features, and the second set of detected features.

16. The computer program product of claim 15, further comprising program code executable by the processor to log out of the website after the first verification, the second verification, and the detection of the third social login account login.

17. The computer program product of claim 15, further comprising program code executable by the processor to create a local account for the website in response to detecting that the first social login account is not logged in and in response to detecting that the local account is logged in to the website.

18. The computer program product of claim 15, further comprising program code executable by the processor to detect the security flaw in response to detecting that the first social login account was not logged in at the first verification and detecting that the second social login account was logged in at the second verification.

19. The computer program product of claim 15, further comprising program code executable by the processor to detect the security flaw in response to detecting the first social login account was logged in at the first verification, detecting the second social login account was logged in at the second verification, and detecting the first set of features are an outlier to the second set of features.

20. The computer program product of claim 15, further comprising program code executable by the processor to repeat the first, second, and third login attempts and record the resulting features to improve accuracy of the detection.

* * * * *